United States Patent [19]

Shikiya et al.

[11] Patent Number: 4,609,065
[45] Date of Patent: Sep. 2, 1986

[54] WHEEL DRIVE STRUCTURE FOR AGRICULTURAL TRACTOR

[75] Inventors: Hajime Shikiya, Kishiwada; Hiroyuki Miki, Sakai; Yasuo Nakata, Sakai; Kazuo Hirata, Sakai; Seiichi Ishiizumi, Sakai, all of Japan

[73] Assignee: Kubota, Ltd., Osaka, Japan

[21] Appl. No.: 691,772

[22] Filed: Jan. 16, 1985

[30] Foreign Application Priority Data

Jan. 21, 1984 [JP] Japan ................................. 59-9145

[51] Int. Cl.⁴ .............................................. B60K 17/30
[52] U.S. Cl. ...................................... 180/261; 74/607; 74/713

[58] Field of Search ............... 180/255, 260, 261, 262, 180/70.1, 75, 88; 74/607, 713

[56] References Cited

U.S. PATENT DOCUMENTS 2,454,071 11/1948 Le Tourneau ..................... 180/75 X
4,301,886 11/1981 Kinoshita et al. .................... 180/261

Primary Examiner—John A. Pekar
Attorney, Agent, or Firm—Edwin E. Greigg

[57] ABSTRACT

A wheel drive structure for an agricultural tractor comprising a drive case housing a differential mechanism and reduction mechanisms to transmit power from said differential mechanism to wheels. The drive case comprises first and second case portions and said first case portion is made of a structural steel pipe.

9 Claims, 4 Drawing Figures

4,609,065

WHEEL DRIVE STRUCTURE FOR AGRICULTURAL TRACTOR

BACKGROUND OF THE INVENTION

This invention relates to a wheel drive structure for an agricultural tractor comprising a drive case supporting a right and left pair of wheels, the drive case housing a differential mechanism in an intermediate position between a righthand end and a lefthand end thereof and reduction mechanisms in the righthand end and the lefthand end, respectively, to transmit power from the differential mechanism to the wheels.

With the above tractor, the smaller the outside diameter of a portion of the drive case housing the differential mechanism and a pair of transmission shafts operatively connecting the differential mechanism to the two reduction mechanisms, respectively, the higher is that portion of the drive case from the ground and the less likely is the drive case to come into contact with ridges or crop when the tractor engages in work while straddling the ridges in a field. Furthermore, since the differential mechanism has a larger outside diameter than the transmission shafts extending from the differential mechanism to the reduction mechanisms, it has been conventional that the portion of the drive case housing the differential mechanism and the transmission shafts comprises a combination of individual parts, namely a part for housing the differential mechanism and two other parts having a smaller diameter than the mentioned part and housing the transmission shafts, respectively. Therefore, that portion of the drive case, and hence the entire drive case, is expensive to manufacture.

SUMMARY OF THE INVENTION

A primary object of the invention is to provide a drive case whose portion housing the differential mechanism and transmission shafts has a maximum height above the ground and which may be manufactured at low cost.

To achieve the above object a wheel drive structure for an agricultural tractor according to this invention comprises a drive case supporting a right and left pair of wheels, the drive case housing a differential mechanism in an intermediate position between a righthand end and a lefthand end thereof and reduction mechanisms in the righthand end and the lefthand end, respectively, to transmit power from the differential mechanism to the wheels, wherein the drive case comprises a first case portion housing the differential mechanism and a pair of transmission shafts operatively connecting the differential mechanism to the reduction mechanisms, respectively, and a pair of second case portions housing the reduction mechanisms, respectively, the first case portion being a length of structural steel pipe extending between the second case portions.

As described above, the first case portion comprises one continuous unit extending from one of the second case portions to the other, with a small diameter gear provided to mesh with a pinion gear. The first case portion now has a maximum height above the ground away from ridges and crop and permits the tractor to operate desirably. Moreover, the first case portion may be manufactured at low cost utilizing an existing structural steel pipe; the manufacture involves minor shaping work only such as perforating it to receive the pinion gear and constricting certain of its parts. This results in low cost of the drive case taken as a whole.

A secondary object of this invention is to fully compensate for inability to provide a great reduction ratio resulting from the differential mechanism being housed in the steel pipe having a substantially equal diameter, as described above.

In order to achieve the secondary object, the invention provides, in addition to the foregoing construction, reduction mechanisms each having a greater reduction ratio than an average reduction ratio provided for the right and left wheels by the differential mechanism.

Even though torque input to the differential mechanism is insufficiently reduced by the small diameter gear in mesh with the input pinion gear, the small diameter gear being provided to decrease the outside diameter of the differential mechanism, it is compensated for by the reduction mechanisms each having a greater reduction ratio than an average reduction ratio provided for the right and left wheels by the differential mechanism. In order that the wheels receive a predetermined value of torque transmission, the rotary power transmitted to the differential mechanism is reduced to predetermined slow rotations for transmission to the wheels. Thus, this arrangement has the advantage of effecting sufficient reduction while permitting the first case portion to be formed of an inexpensive, continuous steel pipe extending from one of the second case portions to the other.

Other advantages of this invention will be apparent from the following description given with reference to the drawings.

BRIEF DESCRIPTION OF THE DRAWINGS

The drawings show a wheel drive structure for an agricultural tractor according to this invention, in which.

DETAILED DESCRIPTION OF THE PREFERRED EMBODIMENTS

Figure 1:
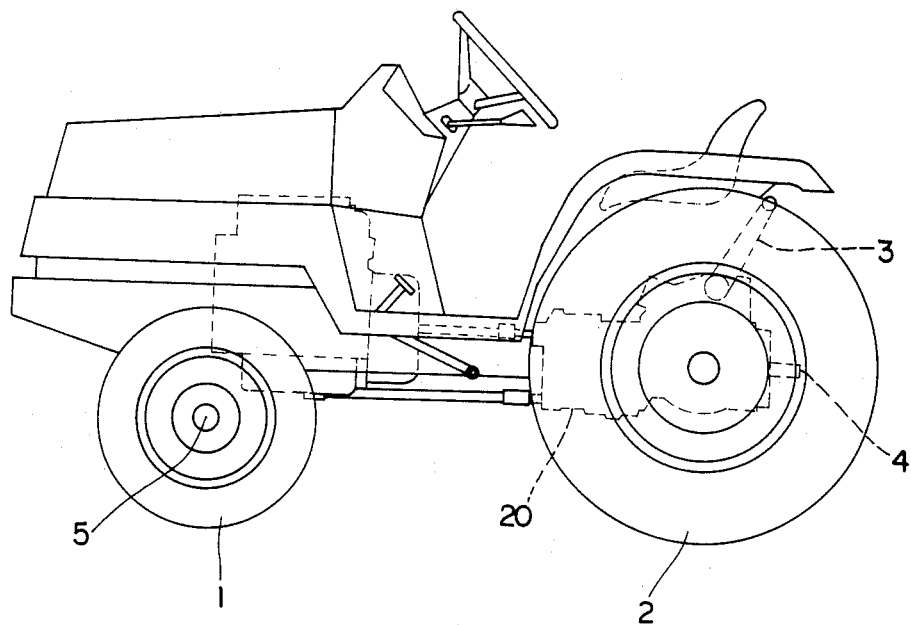
FIG. 1 is a side elevation of an agricultural tractor.

Referring to FIG. 1, an agricultural tractor comprises a four wheel drive vehicle having a right and left pair of dirigible front wheels 1 and a right and left pair of non-dirigible rear wheels 2. The tractor includes a lift arm 3 at the rear end thereof for vertically movably attaching a rotary plow or other working implements, and a power takeoff shaft 4 again at the rear end thereof for driving the attached working implement.

Figure 2:
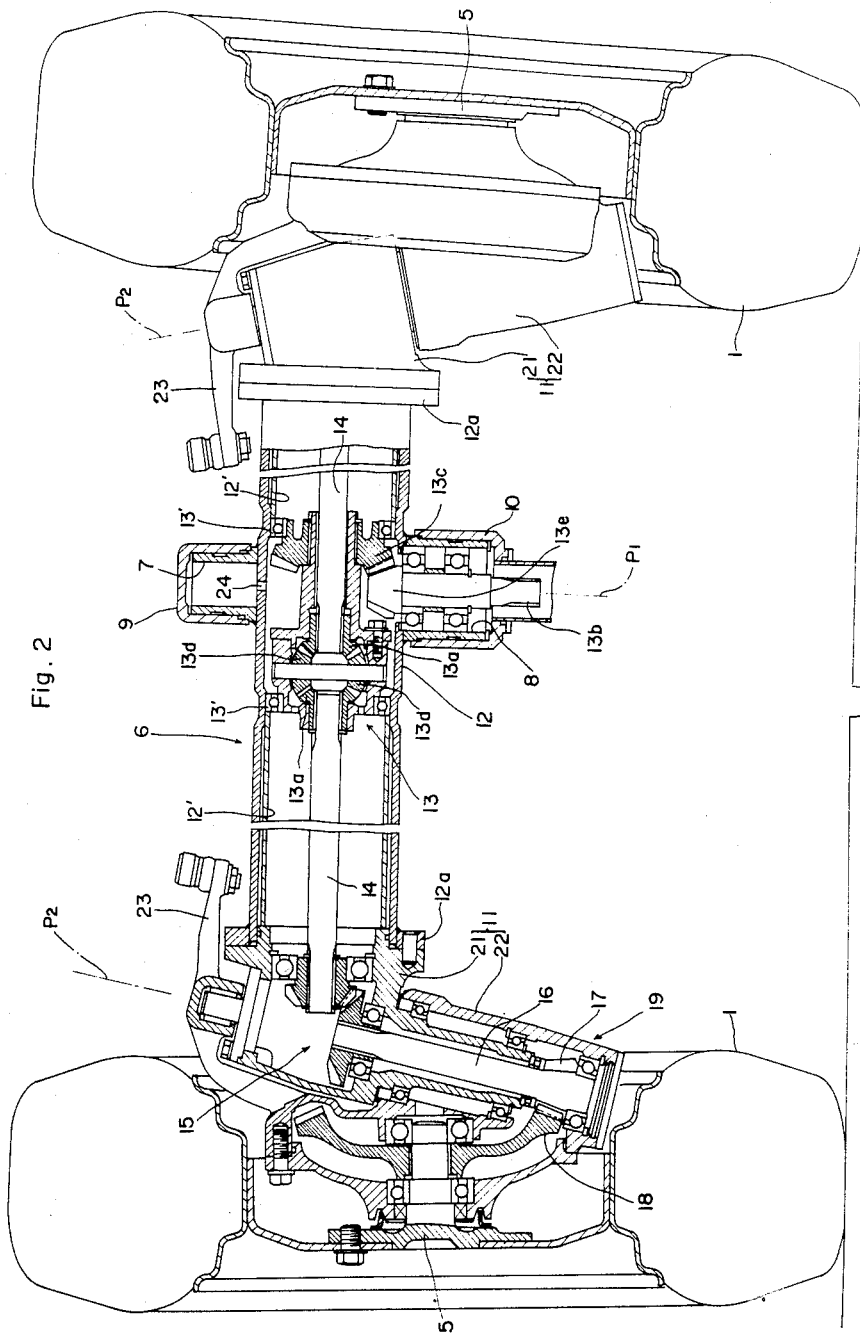
FIG. 2 is a partly developed and partly broken away rear view of a front wheel mounting structure.

Referring to FIG. 2, the tractor further includes a drive case 6 bearing the front wheels 1 at right and left ends thereof by means of axles 5. The drive case 6 includes a pair of front and rear tubular supports 7 and 8 welded to an intermediate position between the right and left ends thereof. By means of these supports 7 and 8 and a pair of front and rear bosses 9 and 10 provided on a tractor body the drive case 6 is vertically oscillatable about an axis P1 extending longitudinally of the tractor body. Thus, the front wheels 1 are attached to the tractor body to be vertically oscillatable in opposed relationship with each other about the axis P1, whereby the tractor body maintains a substantially horizontal posture regardless of an incline of the ground transversely of the tractor.

A front wheel drive structure will be described hereinafter. The drive case 6 comprises a first case portion 12 formed of a length of structural steel pipe and two second, cast case portions 11, the first case portion 12 constituting an intermediate portion and the second case portions 11 constituting the right and left ends of the drive case 6, respectively. The first case portion 12 houses a differential mechanism 13 at an intermediate position thereof and a right and left pair of transversely extending transmission shafts 14 operatively connected to a right and left pair of side gears or output gears 13a of the differential mechanism 13, respectively. Each of the second case portions 11 houses a vertically extending transmission shaft 16 operatively connected to one of the transverse transmission shafts 14 through a bevel gear mechanism 15 acting as reduction means, and a bevel gear reduction mechanism 19 comprising a small drive gear 17 formed integral with a lower end of the vertical transmission shaft 16 and a large driven gear 18 in mesh with the small gear 17 and splined to the axle 5. The bevel gear reduction mechanism 19 has a greater reduction ratio than an average reduction ratio provided for the right and left front wheels 1 by the differential mechanism 13. The differential mechanism 13 receives an output torque of a transmission 20 through an input shaft 13b, reduces its speed and divides the output to right and left. The divided output is transmitted to each axle 5 after being reduced by the bevel gear mechanisms 15 and 19. Number 13e in FIG. 2 denotes a drive pinion gear, and number 13d denotes a pair of pinion gears.

As shown in FIG. 2, the first case portion 12 contains two position setting tubes 12' to retain bearings 13' of the differential mechanism 13 in position axially of the transverse transmission shafts 14. These tubes 12' are removably inserted into the first case portion 12 and retain the bearings 13' in position by abutting against the bearings 13' and against case portions 21 to be described hereinbelow.

A construction to render the front wheels 1 dirigible will be described next. Each of the second case portions 11 comprises a stationary case portion 21 housing the vertical transmission shaft 16 and fixed to a flange 12a of the first case portion 12, and an oscillatable case portion 22 having the axle 5 and connected to the stationary case portion 21 to be oscillatable about a vertical axis P2 coaxial with the vertical transmission shaft 16. The oscillatable case portion 22 is oscillated by means of a knuckle arm 23.

The first case portion 12 defines a bore 24, as seen in FIG. 2, to permit lubricating oil in the first case portion 12 to flow into the boss 9 as lubricant between the boss 9 and the tubular support 7.

The bevel gear reduction mechanism 19 may be replaced by a planetary reduction mechanism, and they are generally called reduction mechanism in this specification.

Figure 4:
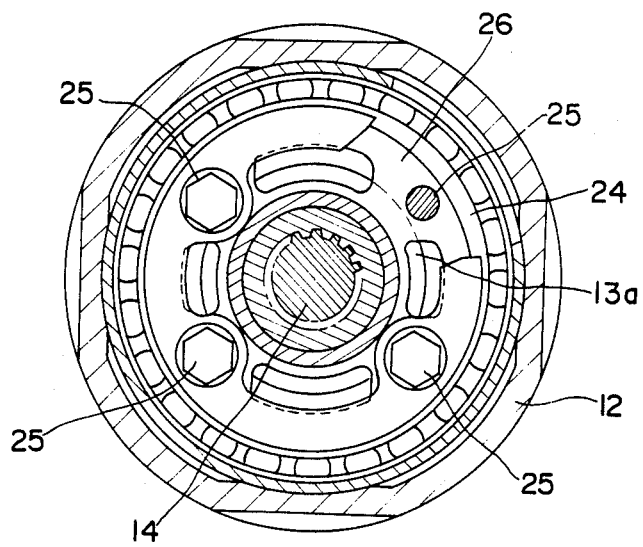
FIG. 4 is a sectional view taken on line IV—IV of FIG. 3.
Figure 3:
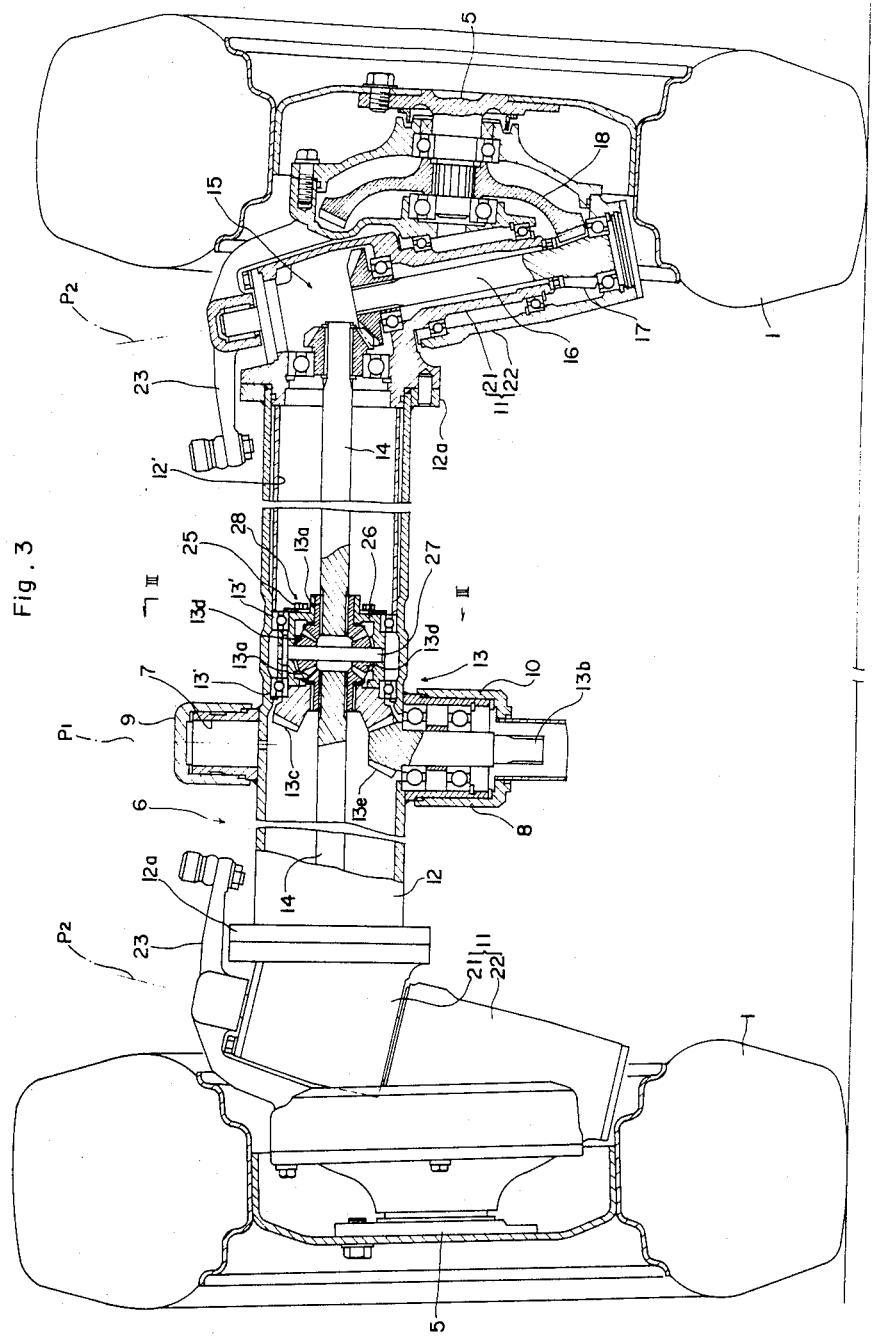
FIG. 3 is a partly developed front view of the front wheel mounting structure.

FIGS. 3 and 4 show a modified embodiment in which only one position setting tube 12' is provided on one side of the differential mechanism 13. This embodiment will particularly be described hereinafter using like reference numbers for like components in the preceding embodiment.

Referring to FIG. 3, a drive case 6 is provided bearing the front wheels 1 at right and left ends thereof by means of axles 5. The drive case 6 includes a tubular support 7 and an input shaft case 8 welded to an intermediate position between right and left ends thereof. The drive case 6 is attached through the tubular support 7 and the input shaft case 8 to a pair of front and rear bosses 9 and 10 provided on a tractor body, to be vertically oscillatable about an axis P1 extending longitudinally of the tractor body. Thus, the front wheels 1 are attached to the tractor body to be vertically oscillatable in opposed relationship with each other about the axis P1, whereby the tractor body maintains a substantially horizontal posture regardless of an incline of the ground transversely of the tractor.

A front wheel drive structure will be described hereinafter. The drive case 6 comprises a first case portion 12 formed of a length of structural steel pipe and two second, cast case portions 11, the first case portion 12 constituting an intermediate portion and the second case portions 11 constituting the right and left ends of the drive case 6, respectively. The first case portion 12 houses a differential mechanism 13 and a right and left pair of transversely extending transmission shafts 14 operatively connected to a right and left pair of side gears of the differential mechanism 13, respectively. Each of the second case portions 11 houses a vertically extending transmission shaft 16 operatively connected to one of the transverse transmission shafts 14 through a bevel gear mechanism 15 acting as reduction means, and a bevel gear reduction mechanism 19 comprising a small drive gear 17 formed integral with a lower end of the vertical transmission shaft 16 and a large driven gear 18 in mesh with the small gear 17 splined to the axle 5. The differential mechanism 13 receives an output torque of a transmission 20 through an input shaft 13b, reduces its speed and divides the output to right and left. The divided output is transmitted to each axle 5 after being reduced by the bevel gear mechanism 15 and 19.

A construction to render the front wheels 1 dirigible will be described next. Each of the second case portion 11 comprises a stationary case portion 21 housing the vertical transmission shaft 16 and fixed to a flange 12a of the first case portion 12, and an oscillatable case portion 22 having the axle 5 and connected to the stationary case portion 21 to be oscillatable about a vertical axis P2 coaxial with the vertical transmission shaft 16. The oscillatable case portion 22 is oscillated by means of a knuckle arm 23.

The differential mechanism 13 comprises a drive pinion gear 13e, a driving gear 13c, and a differential portion 28. The differential portion 28 includes a differential gear case 26 fixed to the driving gear 13c by four bolts 25 extending through a space between bearings 13' of the differential gear case 26 through a support pin 27, and the pair of side gears 13a attached to the differential gear case 26 and the driving gear 13c, respectively. As seen in FIG. 3, the differential portion 28 and the drive pinion gear 13e are opposed to each other transversely of the tractor across the driving gear 13c. Further, the driving gear 13c and the differential gear case 26 have similar outside diameters to render the differential mechanism 13 compact.

Reference number 12' denotes a position setting tube abutting at one end thereof against one of the bearings 13' of the differential mechanism 13 and at the other end against the flange 12a, the other bearing 13' being held in position by a snap ring fitted to the first case portion 12, whereby the differential mechanism 13 is fixed in position in the first case portion 12. This construction involving only one position setting tube has the advantage of low manufacturing cost over the preceding embodiment in which two position setting tubes are used.

What is claimed is:

1. A wheel drive structure for an agricultural tractor comprising:

drive case means extended transversely of said tractor for supporting right and left wheels, said drive case means comprising a first case member and a pair of second case members connected to opposite ends of said first case member;

said first case member being formed of a length of structural steel pipe and housing a differential means in an intermediate portion thereof and a pair of differential output shafts extending in opposite directions from said differential means;

said differential means including a driving gear operatively connected to a differential input shaft and a differential gear case fixedly secured to said driving gear, said driving gear and said differential gear case having a substantially same outer diameter;

said second case members each housing reduction means, said reduction means operatively connected to one of said differential output shafts from said differential means for driving one of said wheels, said reduction means having a greater reduction ratio than an average reduction ratio of said differential means.

2. The structure of claim 1 wherein
said driving gear and said differential gear case are integrally interconnected by a tubular member, said tubular member being rotatably mounted on one of said differential output shafts.

3. The structure of claim 2 wherein
said each second case member comprises a stationary case portion fixed to said first case member and an oscillatable case portion oscillatably supported around said stationary case portion and including an axle, said stationary portion having a tubular flange portion fitted in an inner surface of said first case member.

4. The structure of claim 3 wherein
said differential gear case and said driving gear are rotatably supported by first and second bearing means, respectively, said first and second bearing means being retained in positions thereof by position setting tubes arranged between said first and second bearing means and respective said tubular flange portions.

5. The structure of claim 4 wherein
said each position setting tube is concentrically arranged with and inserted within said first case member.

6. The structure of claim 5 wherein
said each reduction means comprises a bevel gear interlocking mechanism including a drive gear attached to a vertical transmission shaft operatively connected to said differential output shaft by bevel gearing, and attached to said axle.

7. The structure of claim 3 wherein
said differential gear case and said driving gear are rotatably supported by first and second bearing means, respectively, said first bearing means being retained in its position by a first position setting tube arranged between said first bearing means and said tubular flange portion of one of said stationary portion, said second bearing means being retained in its position by a second position setting tube arranged between said first and second bearing means.

8. The structure of claim 7 wherein
said each position setting tube is concentrically arranged with and inserted within said first case member.

9. The structure of claim 8 wherein
said each reduction means comprises a bevel gear interlocking mechanism including a drive gear attached to a vertical transmission shaft operatively connected to said differential output shaft by bevel gearing, and attached to said axle.

* * * * *